T. M. CONNER.
WIRE FENCE MACHINE.
APPLICATION FILED SEPT. 2, 1910.

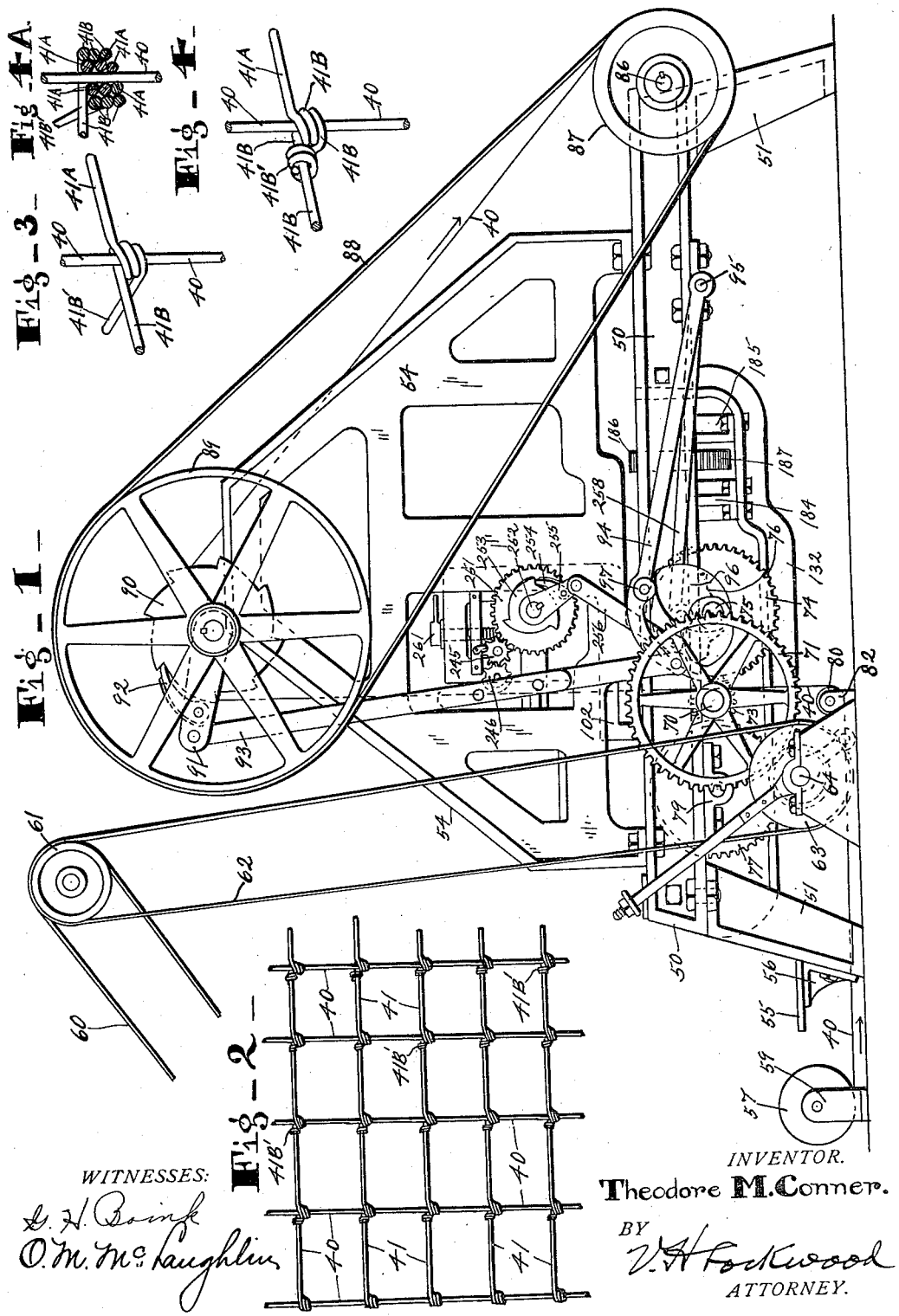

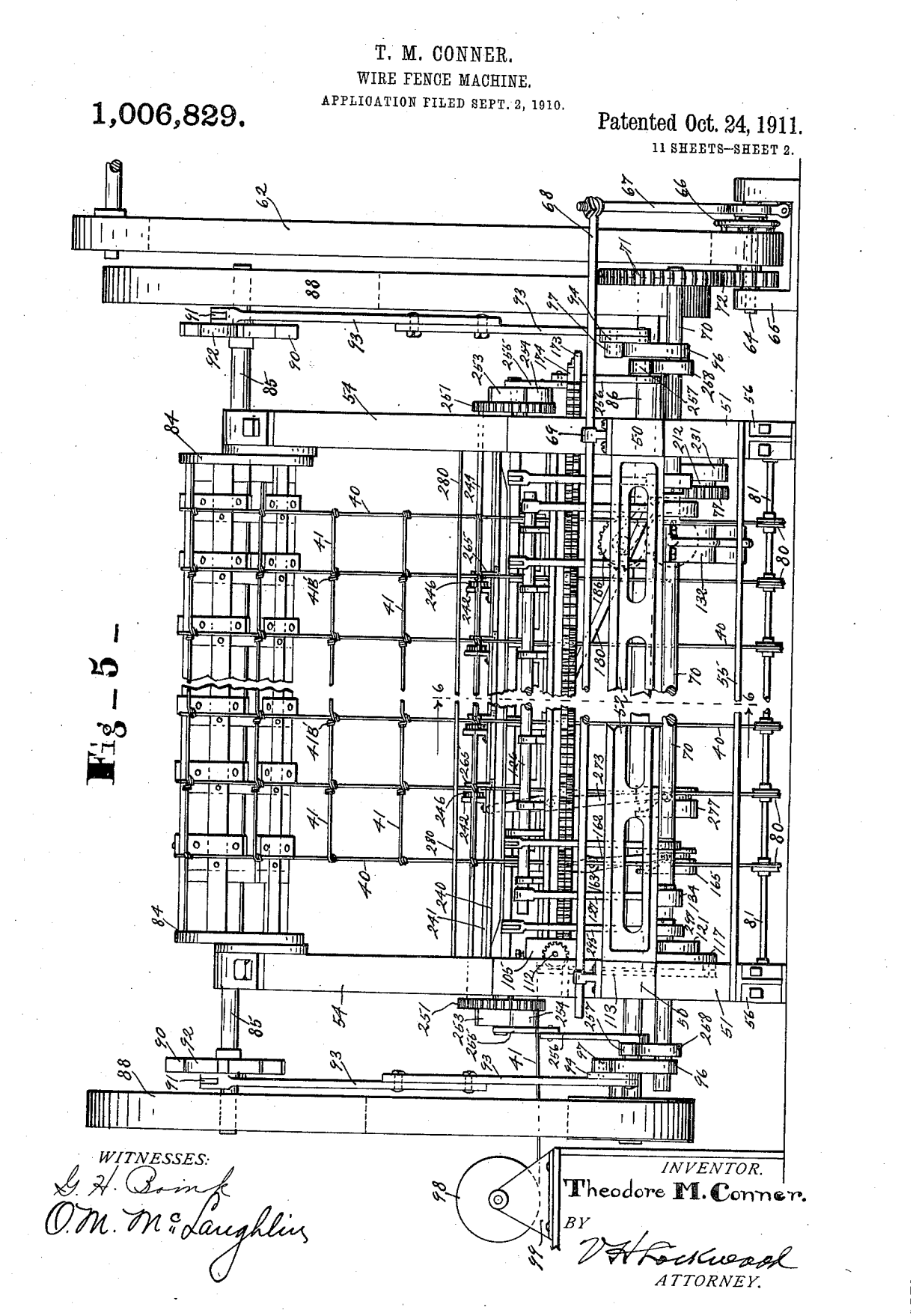

1,006,829.

Patented Oct. 24, 1911.
11 SHEETS—SHEET 2.

Fig-5-

WITNESSES:
G. H. Boink
O. M. McLaughlin

INVENTOR.
Theodore M. Conner.
BY
V. H. Lockwood
ATTORNEY.

T. M. CONNER.
WIRE FENCE MACHINE.
APPLICATION FILED SEPT. 2, 1910.
1,006,829.
Patented Oct. 24, 1911.
11 SHEETS—SHEET 3.
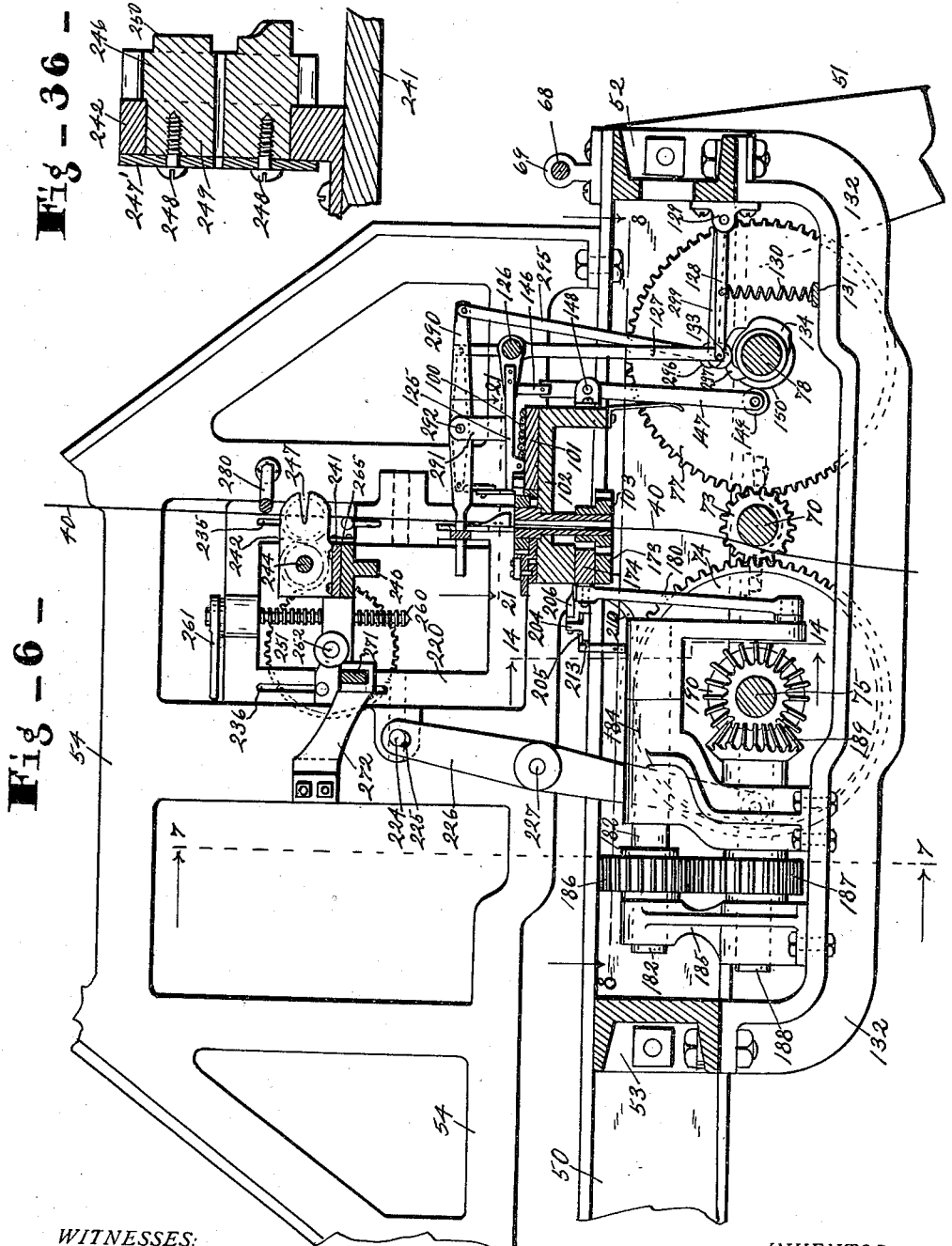
WITNESSES:
G. H. Boink
O. M. McLaughlin
INVENTOR.
Theodore M. Conner.
BY
V. H. Lockwood
ATTORNEY.

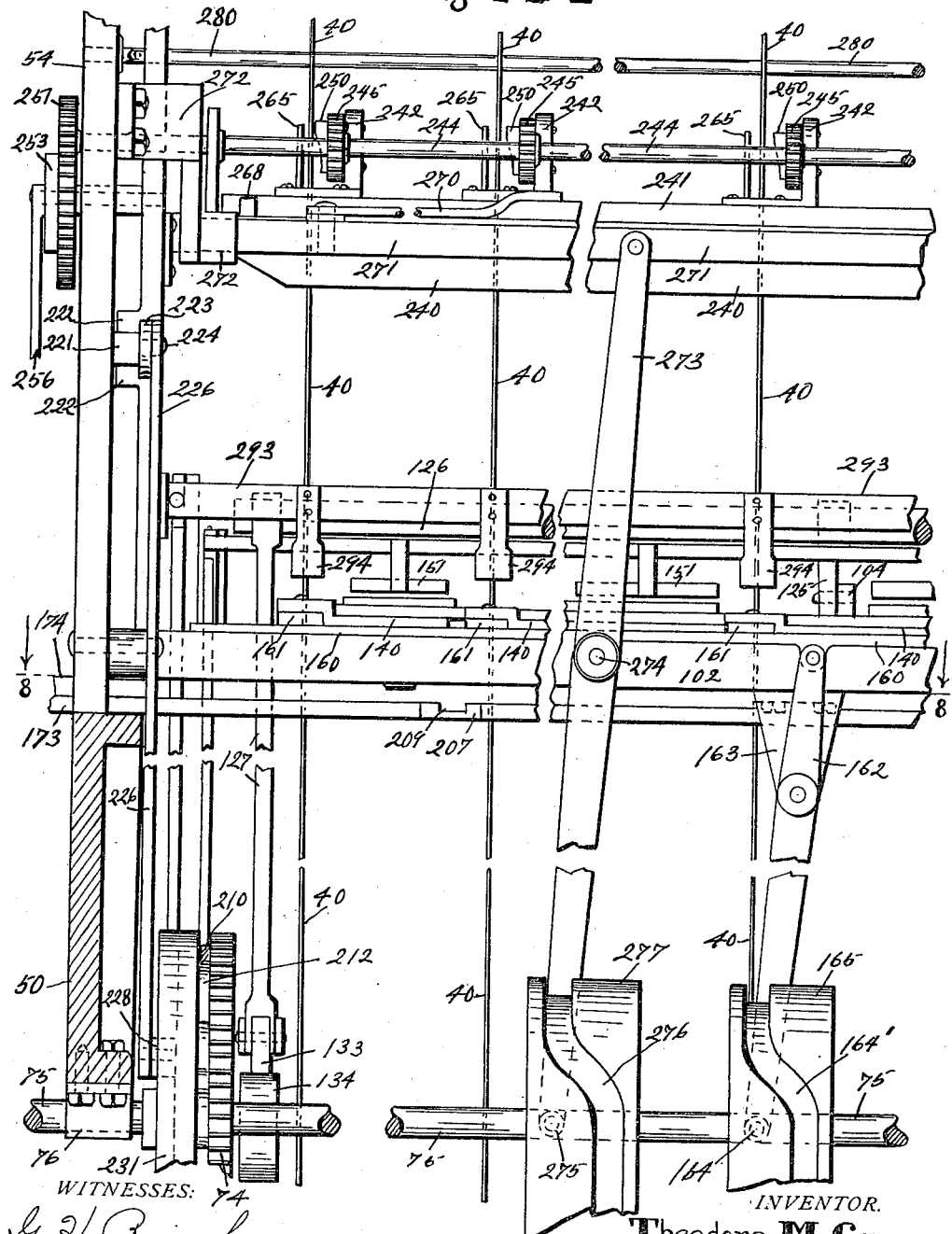

T. M. CONNER.
WIRE FENCE MACHINE.
APPLICATION FILED SEPT. 2, 1910.
1,006,829.
Patented Oct. 24, 1911.
11 SHEETS—SHEET 5.
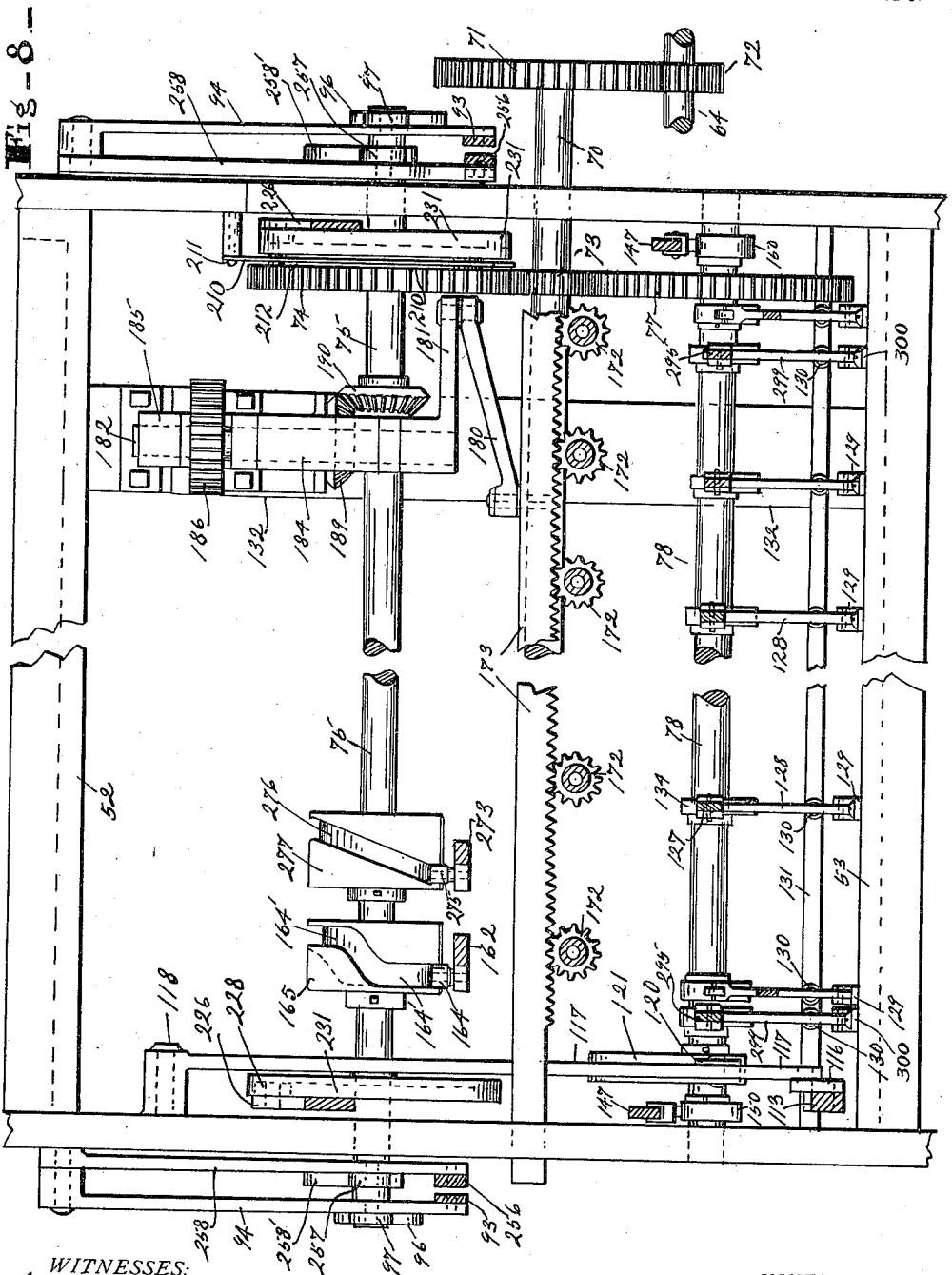
WITNESSES:
INVENTOR.
Theodore M. Conner.
BY
ATTORNEY.

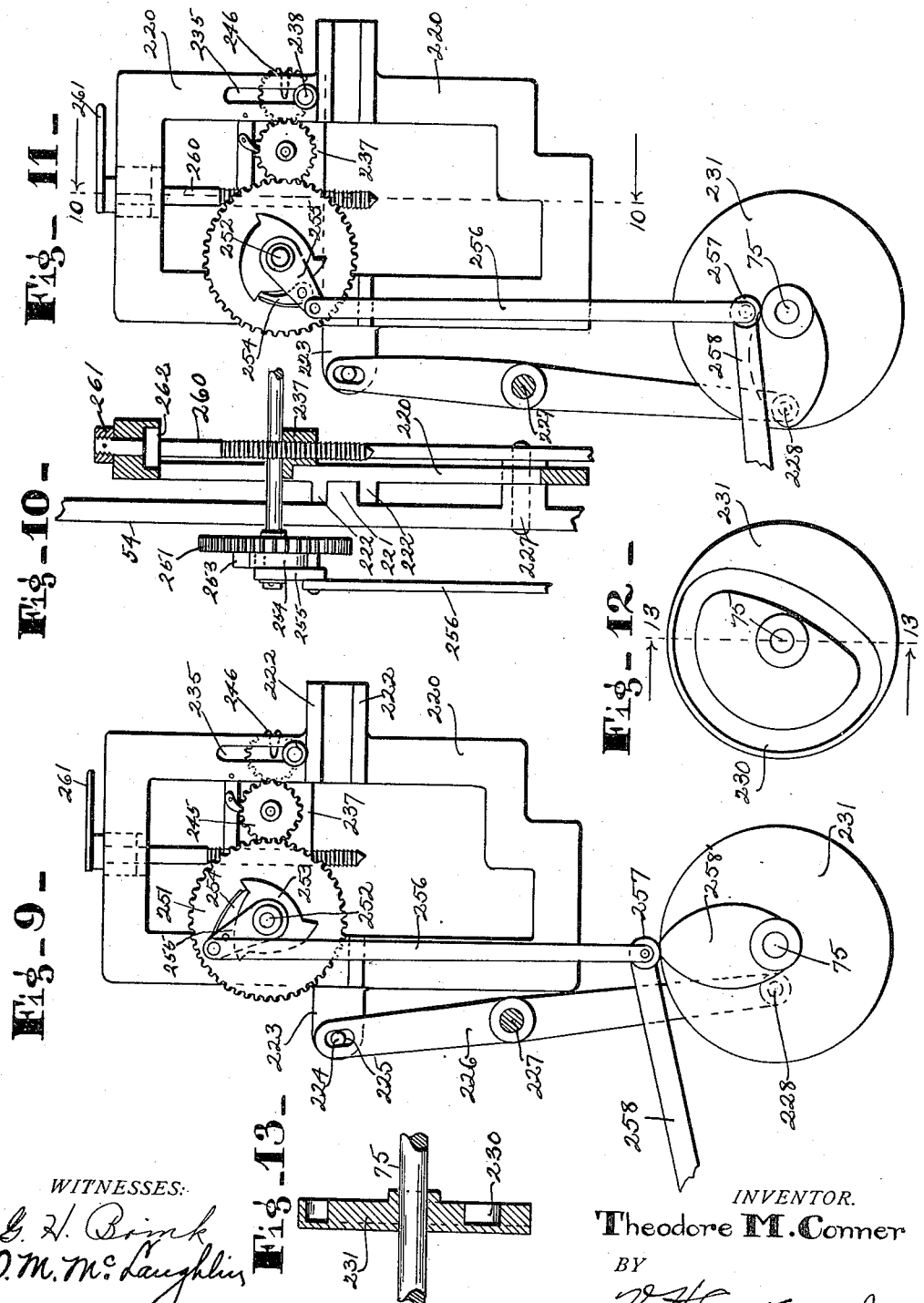

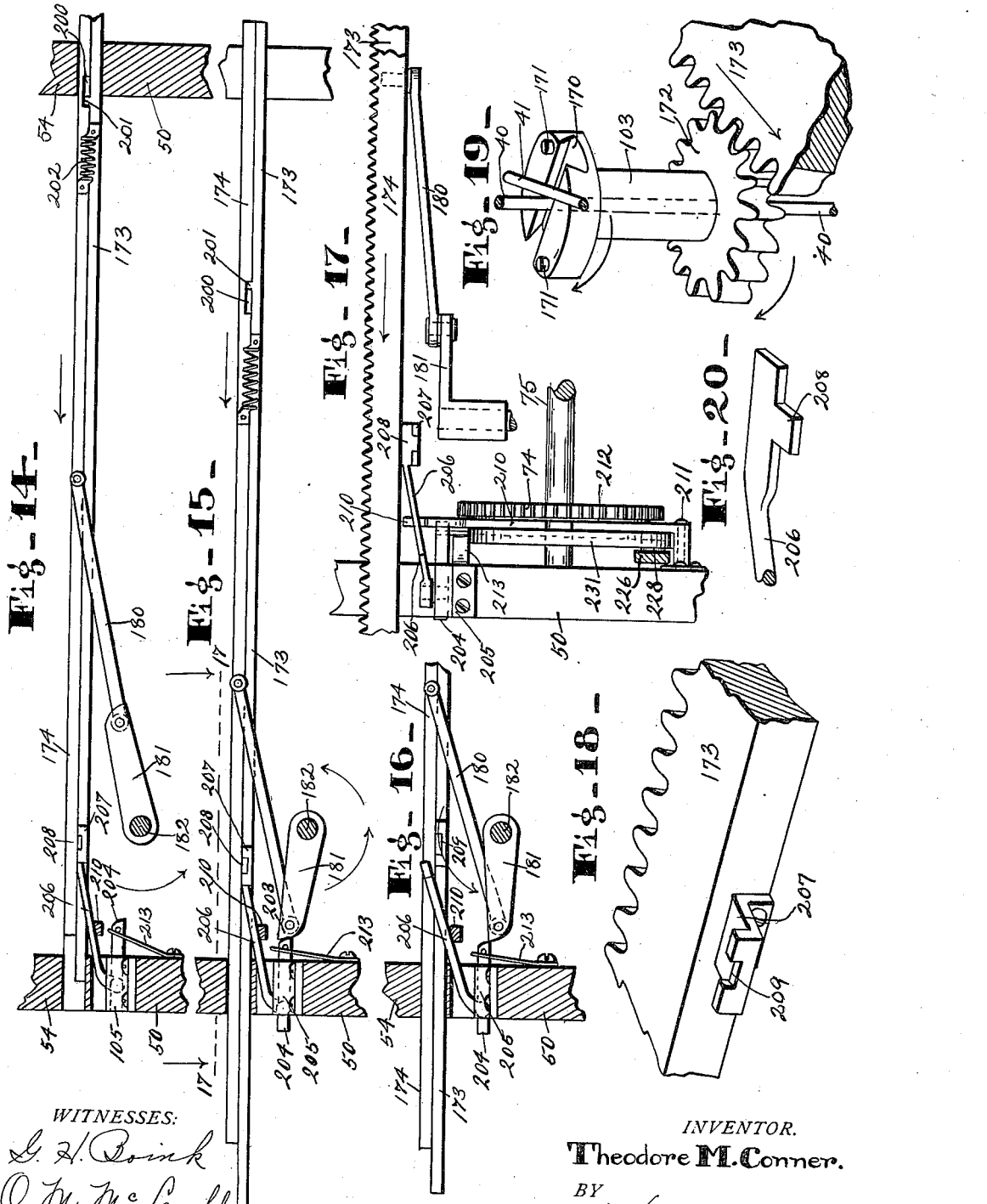

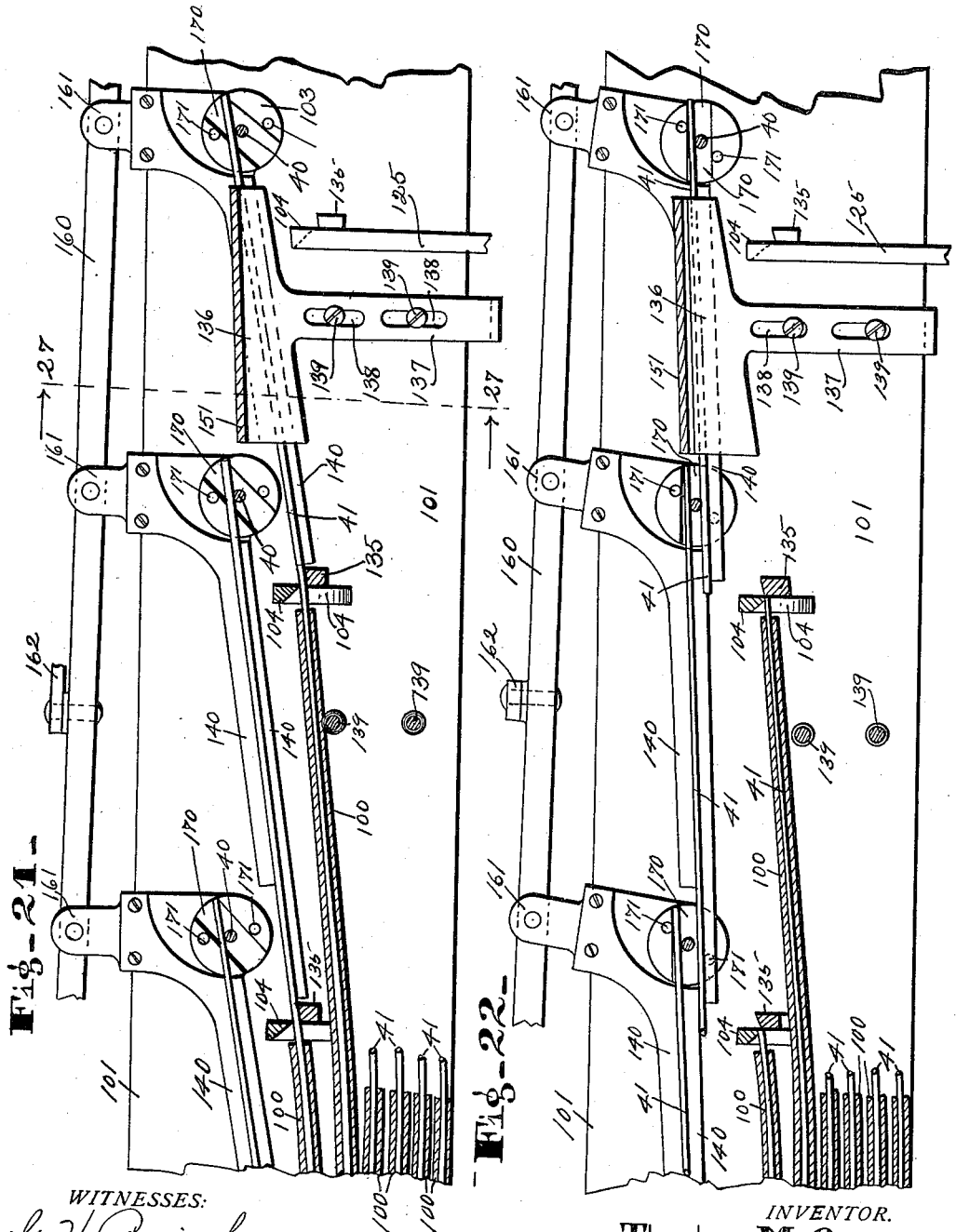

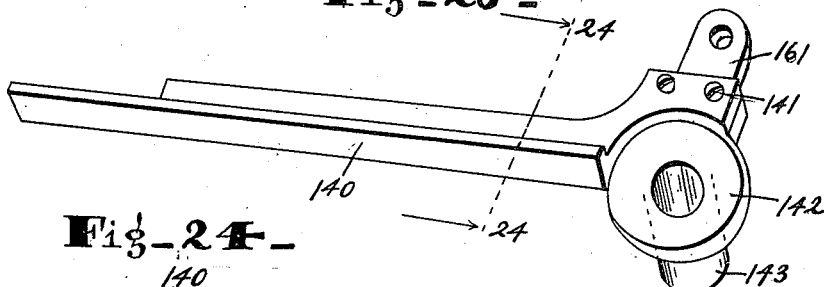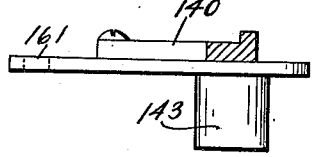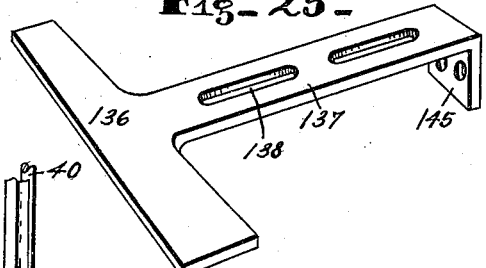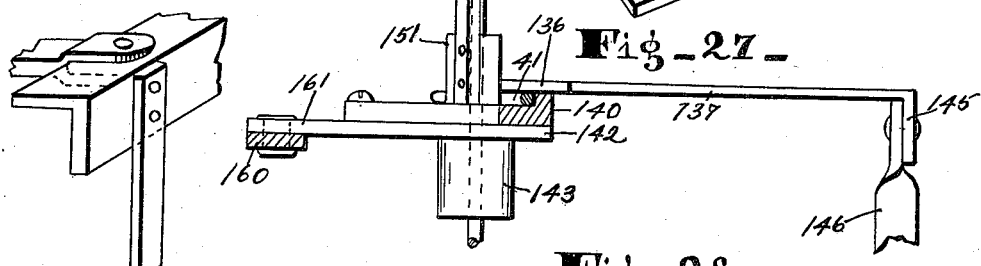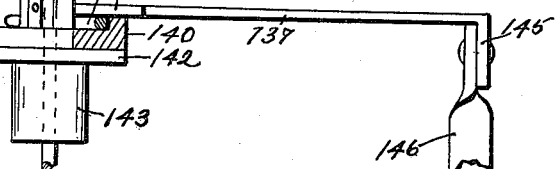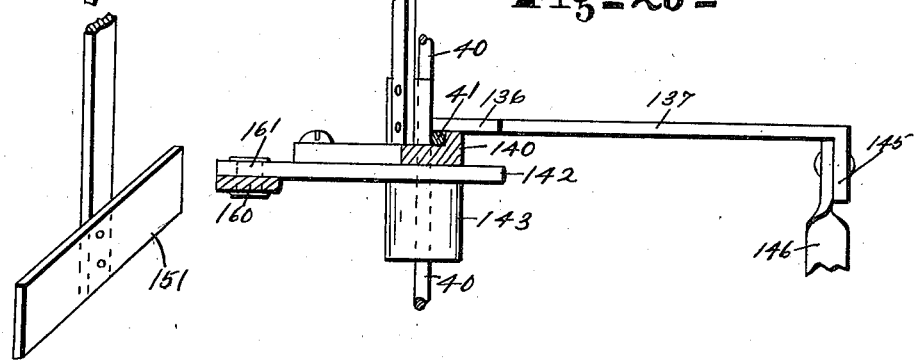

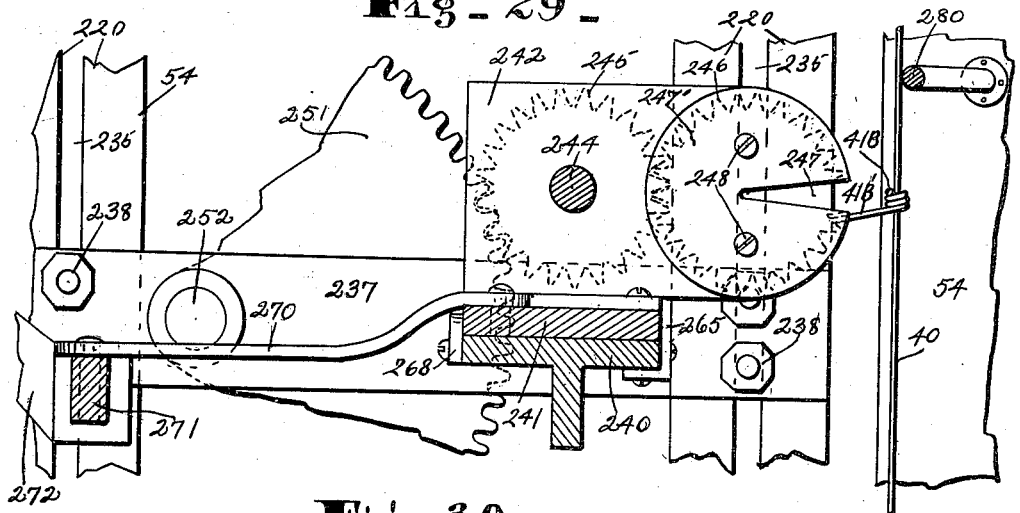

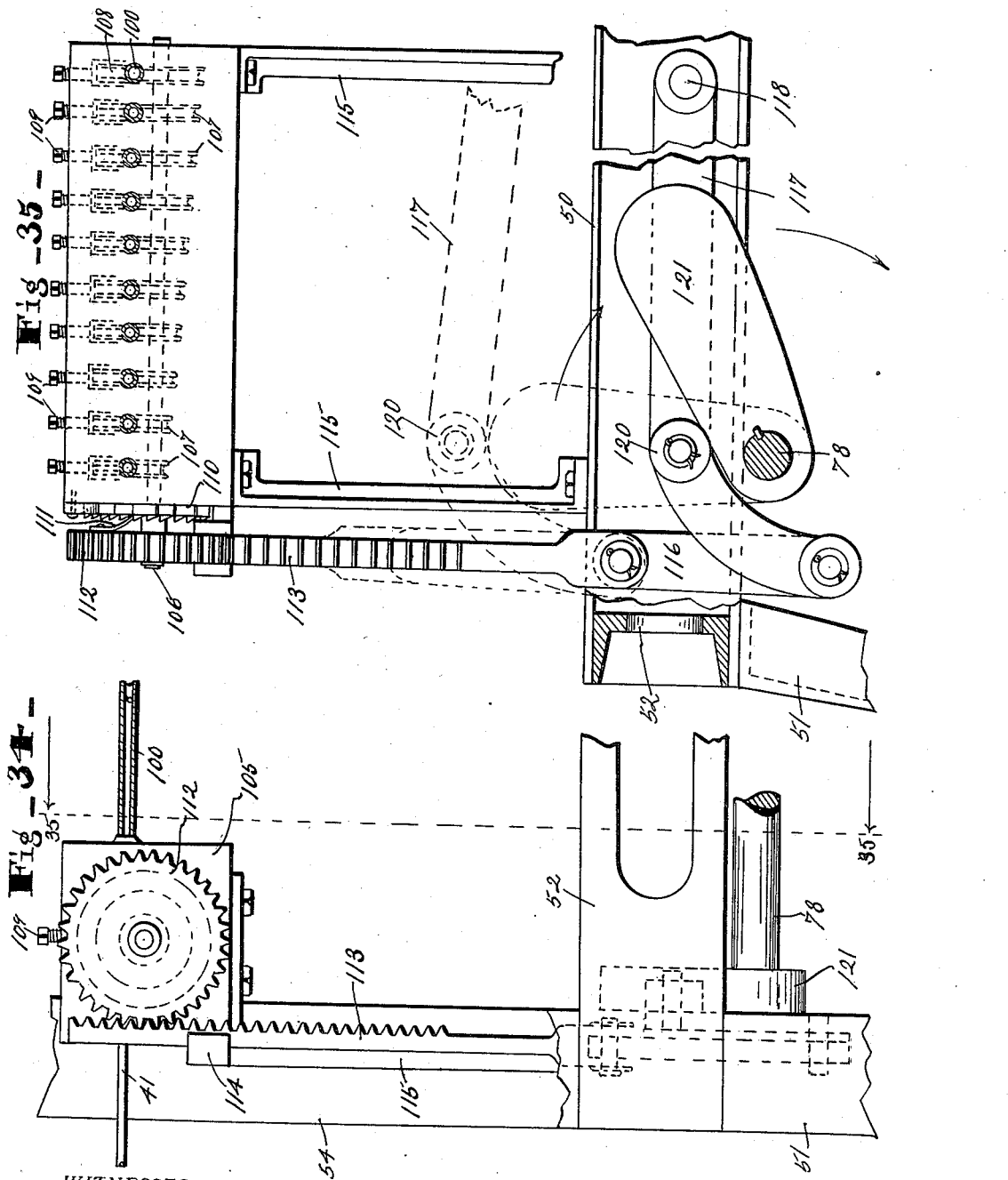

UNITED STATES PATENT OFFICE.

THEODORE M. CONNER, OF TUSCOLA, ILLINOIS.

WIRE-FENCE MACHINE.

1,006,829.  Specification of Letters Patent.  Patented Oct. 24, 1911.

Application filed September 2, 1910. Serial No. 580,188.

*To all whom it may concern:*

Be it known that I, THEODORE M. CONNER, of Tuscola, county of Douglas, and State of Illinois, have invented a certain new and useful Wire-Fence Machine; and I do hereby declare that the following is a full, clear, and exact description thereof, reference being had to the accompanying drawings.

The object of this invention is to improve the construction and operation of machines for making wire fence or similar wire fabric, wherein the cross wires are sectional, extending only from one strand wire to the next one, and both ends of the cross wires are coiled around the strand wires.

The chief feature of the invention consists in providing means for making a second twist of each section about itself adjacent its twist about the strand wire, for the purpose of making a tighter joint or twist and such as will prevent the cross wire from slipping on the strand wire. This feature of the invention is carried out, broadly speaking, by first twisting one end of each cross wire around a strand wire so as to leave a short extension and then subsequently twisting that short extension of the cross wire around the main part of the cross wire adjacent the strand wire.

Another feature of the invention consists in means for retaining and guiding each section of cross wire after it is cut off until it is twisted around the strand wires.

Another feature of the invention consists in novel means for moving each section of the cross wire after it has been severed into position on the twisters and adjacent the strand wires.

Another feature of the invention consists in the means for driving the feed rollers which feed in the cross wires to the machine.

The full nature of the invention will be understood from the accompanying drawings and the following description and claims.

In the drawings Figure 1 is a side elevation of the right-hand side of the machine. Fig. 2 is a plan view of a portion of wire fabric formed by the machine. Fig. 3 is a perspective view of the union of three wires after the first twist has been formed. Fig. 4 is the same after the second twist has been formed. Fig. 4ᴬ is a section of what is shown in Fig. 3. Fig. 5 is a front elevation of the machine but centrally broken away. Fig. 6 is a vertical longitudinal section through part of the machine on the line 6—6 of Fig. 5 with certain parts omitted. Fig. 7 is a vertical transverse section through a portion of the machine on the line 7—7 of Fig. 6, with parts omitted and parts centrally broken away. Fig. 8 is a horizontal section on the line 8—8 of Fig. 6, with parts omitted and the whole centrally broken away. Fig. 9 is a detail view, partly in elevation and partly in section, of a portion of the means shown in Fig. 6 for shifting the upper twister mechanism. Fig. 10 is a vertical section through what is shown in Fig. 9 on the line 10—10 of Fig. 11. Fig. 11 is the same as what is shown in Fig. 9 with parts in altered position. Fig. 12 is an inside elevation of the cam shown at the lower part of Fig. 9. Fig. 13 is a section on the line 13—13 of Fig. 12. Fig. 14 is a vertical section on the line 14—14 of Fig. 6, showing the means for shifting the rack bars for actuating the lower twisters. Fig. 15 is the same showing the parts in altered position. Fig. 16 is the same as the left-hand portion of Fig. 15 with parts in a slightly altered position. Fig. 17 is a horizontal section on the line 17—17 of Fig. 15 with parts omitted. Fig. 18 is an enlarged perspective view of a portion of the rack bar shown in Fig. 17. Fig. 19 is a perspective view of the lower twister and associated parts, with some parts broken away. Fig. 20 is a perspective view of the catch bar for resetting the twisters. Fig. 21 is a horizontal section on the line 21—21 of Fig. 6. Fig. 22 is the same with parts in altered position. Fig. 23 is a perspective view of a shifting finger shown in Fig. 21. Fig. 24 is a section on the line 24—24 of Fig. 23. Fig. 25 is a perspective view of a wire holder shown in Fig. 21. Fig. 26 is a perspective view, with parts broken away, of the means for holding the wire while it is being cut. Fig. 27 is a section on the line 27—27 of Fig. 21 and showing the parts assembled which appear in Figs. 23–26. Fig. 28 is the same as Fig. 27 with parts in altered position. Fig. 29 is an enlarged showing of the portion of the machine as indicated in the upper part of Fig. 6. Fig. 30 is the same with parts in altered position. Fig. 31 is an elevation of the right-hand end of Fig. 30. Fig. 32 is a section on the line 32—32 of Fig. 31. Fig. 33 is a perspective view of the upper twister shown in Fig. 31. Fig. 34 is a side elevation of a portion of the machine that is shown in the lower part of Fig. 5 and consisting of the feeding-in mechanism of the cross wires, parts being in section. Fig. 35 is a section on the line 35—35 of Fig. 34. Fig. 36 is a central vertical section through the upper twister.

The machine herein shown is adapted to form a wire fabric as indicated in Figs. 2, 3 and 4. This fabric is formed of longitudinal or strand wires 40 parallel with each other and located at suitable distances apart, and short cross wires 41 that merely extend from one strand wire to the next. The purpose of the machine is to unite the ends of the cross wires 41 to the strand wires. This is done by twisting one end of one cross wire, say 41$^A$, twice around the strand wire 40, then twisting the end of the other cross wire 41$^B$ twice around the twisted end of the wire 41$^A$, as shown in Fig. 3, leaving an end extension 41$^{B'}$, with which to make a second twist of such end around the main portion of the same wire 41$^B$, as shown in Fig. 4. This is a sort of knot or union at the intersections of the cross wires with the various intermediate strand wires, but the knot or union of the cross wires with the end strand wires omits the wire with the extension 41$^{B'}$ on it and there is only one twist, as shown in the left-hand end of Fig. 2. This makes a rigid fabric because the cross wires 41$^B$ are coiled about the twists uniting the other cross wire 41$^A$ to the strand wire.

The frame of the machine herein shown consists of side bars 50, legs 51, and cross bars 52 and 53 which are bolted to the side bars, see Figs. 1 and 8. Substantially A-shaped end frames 54 are bolted upon each side bar, said end frames being skeleton frames substantially as shown in Fig. 1. The operator stands on the platform 55 at the forward end of the machine, as seen in Fig. 1, said platform being mounted on the brackets 56 that are secured to the front legs 51. The reel 57 for the longitudinal or strand wires 40 is mounted on the posts 59 separate from the main part of the machine.

Power comes from some suitable source through the belt 60, pulley 61, belt 62, pulley 63 carried by the shaft 64 that is mounted in the frame 65. This frame 65 is separate from the rest of the machine and the pulley 63 is clutched with the shaft by the clutch 66 which is controlled by the clutch lever 67 to which a hand rod 68 is connected, said hand rod running across the machine in guides 69 upon the side bars 50, see Fig. 5. This rod 68 enables the clutch to be operated from either side of the machine or from the front as desired.

The main driving shaft 70 of the machine, as indicated in Figs. 1 and 5, is mounted on the bottom of the side bars 50 in bearings not visible in the drawings herein. It is driven by a spur gear 71, see Fig. 1, that meshes with a pinion 72 on the shaft 64. As shown in Fig. 8, a pinion 73 is secured on the shaft 70 and it meshes with a gear 74 which drives the shaft 75 mounted in bearings 76 on the underside of the side bars 50, see Fig. 7, and with the gear 77 which is secured on the shaft 78, which is mounted in bearings 79 on the underside of the side bars 50, see Figs. 1 and 8.

As shown in Fig. 1, the strand wires 40 come in from the reel 57 and pass under sheave wheels 80 on a rod 81, see Fig. 5, which at each end is mounted in blocks or plates 82 which are secured to the floor. Thence the strand wires extend upwardly, as shown in Figs. 1 and 6, through the lower twisters, past the upper twisters, and over a skeleton roller 84 which is mounted on the upper ends of the end frames 54 by the spindles 85, see Fig. 5. Thence the strand wires pass to the reel on the shaft 86 mounted at the rear end of the machine, and which is driven by the pulley 87 and belt 88 running from a large pulley 89 on the shaft 85. The shaft 85 is driven by the means shown in Figs. 1 and 5. A ratchet wheel 90 is secured on the shaft 85, and a ratchet arm 91 is pivoted on said shaft and carries a pawl 92 to engage the ratchet wheel 90. A connecting bar 93 extends down from the arm 91 and is pivoted to the end of the lever 94. That lever at one end is fulcrumed to the pin 95 secured to the underside of the side bars 50, see Fig. 1. The lever is actuated by the cam 96 which engages the roller 97 on the lever. The cam 96 is secured on the end of the shaft 75. The ratchet wheel 90 and cam 96 are so arranged as to move the strand wires 40 and the wire fabric, at each operation, a distance equal to the desired distance between the cross wires. This ratchet feed machanism is duplicated on both ends of the machine, as shown in Fig. 5.

There is a cross wire 41 fed into the machine for each space between the strand wires. These wires come in from the left-hand side, as shown in Fig. 5, from reels 98 on supports 99. In Fig. 35 there are feeding and guiding means for any number of these cross wires, which come in through tubes 100, see Figs. 6 and 21, which rest upon a plate 101 mounted on the table 102 which is mounted in a horizontal position and each end is secured upon the end bars 50. The top of this table 101 is shown in Fig. 21 and there extends vertically through said table and table top a number of twisters 103, one for each strand wire 40. These twisters are tubular and the strand wires pass vertically through them and are guided by them, as shown in Fig. 6. The tubes 100 are not of the same length but extend across the plate 101 to cutting-off mechanisms 104. The cutting-off mechanisms are located at the desired distance from a twister to obtain a cross wire of the desired length, which length is sufficiently greater than the distance between two twisters to allow for the extension shown in Fig. 3 for forming the second twist shown in Fig. 4. This will be plain from an inspection of Fig. 21.

The cross wires 41 are fed into the machine by the means shown in Figs. 34 and 35 and as indicated in Fig. 5. This part of the mechanism is old, but it consists essentially of a box 105 located longitudinally of the machine near the left-hand side, as shown in Fig. 5. In that box there is a shaft 106 extending longitudinally thereof and at a right angle to the direction of movement of the cross wires 41. Said shaft carries a series of feeding rollers 107 gradually increasing diametrically, as indicated by dotted lines in Fig. 35, one feeding roller for each wire 41. The opposite sides of the box are perforated to permit the wires 41 to pass therethrough and said wires ride upon the rollers 107 and are held in frictional engagement therewith by upper rollers 108 that are held down by set screws 109 which extend downwardly through the top of the box, as indicated by dotted lines in Fig. 35. The tubes 100 are connected with the right-hand side of the box and furnish conduits for the passage and guidance of the wires after leaving the box, so that said cross wires are pushed through the tubes 100. The shaft 106 is driven by a ratchet wheel 110 secured thereon and said ratchet wheel is driven by the pawl 111 which is fastened to a spur gear 112 that rides loosely on the shaft 106 and which is actuated by a vertical rack 113, which operates in the guide 114, which is secured to the box 105. The box is supported by a pair of legs 115 which extend upwardly from the side bar 50, see Figs. 34 and 35. The rack bar 113 is pivoted at its lower end to a connecting bar 116, and the lower end of the connecting bar 116 is pivoted to the free end of a long lever 117 which extends longitudinally of the machine and is pivoted at 118 to the side bar 50, as shown in Figs. 8 and 35. Said lever is elevated or actuated by the roller 120 thereon being engaged by a crank 121, which is secured on the shaft 78. Hence at each revolution of the shaft 78 the lever 117 will be lifted to the dotted-line position shown in Fig. 35, which will give the gear 112 an actuating movement, and when the lever 117 descends, the rack bar 113 will descend therewith by gravity and return the wheel 112 in a position to get a new hold on the ratchet wheel 110. This movement gives the feed rollers 107 a partial revolution, sufficient to enable them to move the wires the right distance to get sections cut therefrom of the desired lengths to suit the various spaces between the strand wires. To that end the rollers 107 vary in diameter to agree with the varying lengths of the sections of the cross wires 41 and the spaces between the strand wires.

If it be desired to build a fence fabric having a smaller number of strand wires than is indicated by the capacity of the machine, the desired number of cross wires 41 are fed in over a group of equal number of said rollers 107. The members of that group of said rollers must be adjacent each other, that is, a group of five wires may be fed in over either the left-hand five shown in Fig. 35, or the right-hand five, or any intermediate group of five of said rollers.

The cutting-off mechanism is old and is not brought out in detail here, but it consists of the knife 104 heretofore mentioned, which is secured to the lever 125 shown at the right-hand of Fig. 6 and which is pivoted between its ends to the table top 101, and its outer end is actuated by a cross rod 126. The cross rod 126 is pivoted to the upper end of a bar 127, which is pivoted at its lower end to a horizontal bar 128, which is in turn pivoted to a bracket 129 and is normally held in a downward position by a spring 130 running from the bar 128 to a cross bar 131 on the frame bar 132, see Fig. 6. At the junction of the bars 127 and 128 a small roller 133 is located, which rides upon a cam 134 secured on the shaft 78. Therefore, each revolution of the shaft 78 which feeds in the cross wires 41 also causes an operation of the knives 104, and the parts are so arranged relatively to each other that the operation of the knife comes at the close of the feeding movement of the cross wires 41. The stationary member 135 of the cutting-off mechanism is secured on the table top 101, as shown in Fig. 21, and the knife 104 coöperates with it to get a shearing effect, the part 135 holding the wire 41 against the cutting action of the knife.

The advancing ends of the cross wires 41 are guided by the guiding plate 140, which is shown in Fig. 23 and which in cross section has an angle bar form, as shown in Fig. 24. One end of said guide bar 140 has secured to it by the screws 141 a bearing which has an enlarged upper portion 142 that rests upon the plate 101 and a central contracted portion 143 which fits down in said plate 101, and the whole bearing surrounds the upper end of the twister 103, see Fig. 6. This guide bar extends from the twister to the cutter mechanism, see Fig. 21. The cross wire 41 is held down in said angle-shaped guide bar 140 by a plate 136 resting upon the upper edge of the vertical side of the guide bar 140, as shown in Fig. 21. It is secured to a shank 137 which has longitudinal slots 138 in it through which headed pins 139 extend from the top plate 101 and permit the longitudinal movement of said shank 137 and the removal of the plate 136 from the guide bar 140 when the strand wires are ready to be moved upwardly. The form of the parts 136 and 137 appears in Figs. 25 to 28, and the shank 137 thereof has a downwardly turned end 145 which projects down over the edge of the top plate 101 and has secured to it, as shown in Fig. 27, a downwardly extending bar 146, which is pivoted to the upper end of the lever 147, see Fig. 6 at the right-hand end. Said lever 147 is fulcrumed between its ends to the bracket 148 on the table 102, and the lower end of said lever carries a roller 149 which bears against the cam 150 on the shaft 78, whereby said lever is actuated and the plate 136 reciprocated at the desired times from the position shown in Fig. 27 to the right and returned, as indicated in Fig. 28. As the plate 136 is moved over the wire 41 to the position shown in Figs. 21 and 27, its advancing edge abuts against the vertical plate 151, see Figs. 26 and 27. The plate 151 coöperates with the guide bar 140 and plate 136 to hold the cross wires 41 in place while being cut. This plate 151 extends at an angle to the direction of movement of the wire 41, as shown in Fig. 21, so that it guides and is engaged by only the advancing end of the wire. That leaves a considerable space between the plate 151 at the rear and the upturned edge of the guide bar 140 to permit the rear end of a cut section of the wire 41 to be shifted over from the position shown in Fig. 21 to that shown in Fig. 22 against the succeeding strand wire 40. This movement is caused by the corresponding movement of the left-hand end of the guide bar 140, and that bar is caused to move by the bar 160, see Fig. 21, which is connected with ears 161 extending from and integral with the enlarged part 142 of the bearing for the guide bar 140, as shown in Fig. 23. The bar 160 is reciprocated, as shown in Fig. 7, by a lever 162 which is fulcrumed between its ends to the lower part of a bracket 163, which is fastened to the table 102. The lower end of said lever 162 carries a roller 164, see the dotted lines in Fig. 7 and full lines in Fig. 8, which travels in the cam groove 164′ in the periphery of the wheel 165, which is secured on the shaft 75. The cams 165 are so set on the shaft 75 as to properly time the movement of the guiding bar 140 to cause them to throw the rear ends of the sections of the wires 41 around from the position in Fig. 21 to that shown in Fig. 22.

The description so far given shows the mechanism for bringing both ends of the sections of the cross wires 41 against the pair of strand wires, as shown in Fig. 22. The ends of the cross wires, however, lie on opposite sides of said strand wires. This lower twister mechanism is old and is illustrated herein best in Fig. 19. It consists of a tubular body portion with an enlarged disk-like head with a horizontal diametric groove 170 with its edges beveled so that the groove is dovetailed in form, and there is space in it on each side of the strand wire 40 which passes up through it to permit the cross wire 41 to enter or drop into the groove beside the cross wire after the rotation of the head has begun. The position of the two types of wires 40 and 41, when the cross wire is first shoved across the top of the twister, is indicated in Fig. 19, and after the twister has begun to rotate in the direction indicated by the arrow in Fig. 19 the wire 41 drops into the groove 170 and the lugs 171 extending upwardly from the head of the twister, one on each side of said groove, assist in causing the wire 41 to enter and lie in the groove 170.

The twister is actuated by the pinion 172 secured to the lower end thereof, as seen in Fig. 19, and which meshes with the rack bar 173. There are two of these rack bars 173 and 174, as appears in Figs. 5, 6 and 14 to 17. They extend transversely of the machine with the bar 174 resting upon the bar 173, as shown in Fig. 15. These bars at their ends rest in openings lying between the side frame bars 50 and the upper side frames 54, and have sliding movement therein, as shown in Fig. 14. The upper bar 174 is used for actuating the twisters for the end or edge strand wires, while the lower bar 173 actuates the twisters for the intermediate strand wires, for as has been stated above, there are two cross wires twisted together around each intermediate strand wire, while there is only one cross wire twisted around the end or edge strand wires. These rack bars 173 and 174 are driven in the following manner: As shown in Fig. 14, a connecting bar 180 is pivoted at one end to the rack bar 174 and at the other end to the end of a crank 181, which is secured on the shaft 182, see Figs. 6 and 8. Said shaft 182 is mounted in a pair of brackets 184 and 185, which extend up from the frame 132, shown in Fig. 6. Said shaft is driven by a gear 186 thereon, which meshes with the gear 187 on the countershaft 188 having bearings in the same brackets 184 and 185 and carrying a beveled gear 189 at one end that meshes with a beveled gear 190 on the shaft 75, see Figs. 6 and 8. As the shaft 182 revolves, the connecting bar 180 will move the upper rack bar 174 first in the direction of the arrow in Fig. 14 and to the position indicated in Fig. 15. Said rack bar has a groove 200 in its underside, as seen in Fig. 14, into which a lug 201 projects from the lower rack bar 173, and the two bars are connected by a spring 202. Hence as the upper rack bar 174 has been moved somewhat, it will start to move the lower rack bar through the action of the spring, at least until the lug 201 from the lower bar has reached the opposite end of the lug 200, and then the two bars are moved together for the remainder of the movement. The movement of said bar so far described is the actuating movement thereof, and when the parts are in the position substantially as shown in Fig. 15, the twisting movement of the twisters ceases and the cross wires are all lifted out of them in the feeding movement of the fabric or strand wires. Immediately after that occurs the lower rack bar 173 is given a further impulse to the left, as shown in Fig. 15, so as to bring it again into its normal relation with the other rack bar 174, which had started first, in other words, to get the bars in the same relative position to each other as in Fig. 14. This impulse is obtained by the crank 181 having a nose 203 that engages the beveled end of a bar 204 mounted in a bearing 205 on the top of the side bar 50, as shown in Fig. 15. A connecting bar 206 is pivoted at one end to said bar 204, and at the other end lies upon the bracket 207, and a dog 208, see Fig. 20, on the bar 206 rests in a notch 209 in the bracket 207, see Fig. 18, to form a connection between the bar 206 and the rack bar 173. Hence, as the crank 181 moves further from the position shown in Fig. 15, it will move the lower rack bar 173 to the left as far as the lug 201 will permit, and bring the two rack bars together again. The function of the spring 202 is to coöperate with the lugs 201 in holding said rack bars in said relative position while the twisters are idle and while the rack bars are returning to their idle movement. As soon as the lower rack bar 173 has been connected to the left into its proper relation with the rack bar 174, then the connecting bar 206 is lifted out of engagement with the lower rack bar by the horizontal lever 210, see Fig. 17, which is fulcrumed at 211 to the end bar 50 of the frame, and is actuated by a projection 212 on the wheel 74 mounted on the shaft 75. Then the spring 213 returns the bar 204 to its original and normal position. Said spring is secured to the end frame bar 50, and its free end bears against a pin on the bar 204, as shown in Fig. 15. The further movement of the crank 181 causes the bar 180 to push the rack bar 174 to the right, which is the return and idle movement, and it through the lug 201 carries the rack bar 173 with it, and during that movement the twisters turn backwardly to their normal positions.

The lower twister mechanism, which has just been described, makes the first twist, the one indicated in Fig. 3. Assuming the parts to be in the position shown in Fig. 22, with both ends of each section of cross wire 41 lying on a pair of twister heads and against a pair of strand wires 40, but on opposite sides thereof, the actuating movement of the twister in the direction of the arrows in Fig. 19 first causes the ends of the cross wires 41 to drop into the grooves 170 of both twisters. Hence there are two cross wires on every intermediate twister, as shown in Fig. 22, said wires being on opposite sides of said strand wires, and after the twister is started, both drop into the groove below and are twisted by a further revolution of the twister head into the form shown in Fig. 3, and the wire with a short end usually twists inside of the coil formed by the wire with a long end, although there is no absolute uniformity, so that in the operation of the intermediate twisters, the knot is like that shown in Fig. 3, while the knot formed by the end twisters should be the same as that with one of the wires, say $41^B$ omitted.

After the first twist is formed by the lower twister above described, the strand wires, and therefore the whole fabric, are moved upwardly by the feeding mechanism heretofore described, which actuates the reel on which the fabric is ultimately wound, and thus lifts said first twister up to the position for forming the second twist on the intermediate strand wires. As has been stated, that movement equals the distance from one cross wire to another, and mechanism is provided for forming the second twist above, while another set of cross wires are being given the first twist below by the means heretofore described. The location of the upper twister mechanism is illustrated in Fig. 6, and it is carried in two end frames 220, which are slidably mounted at each side of the frame 54. As seen in Fig. 10, the stationary frame 54 has a rib or flange 221, and the sliding frame 220 has a pair of ribs or flanges 222 fitting on each side of the rib 221, so that they can slide upon said rib 221 longitudinally of the machine. This sliding movement is caused by the means shown in Figs. 9 to 13. There is an arm 223 extending rearwardly from the frame 220 and centrally thereof, which carries a pin 224 that fits in the slot 225 in the end of a lever 226, which is fulcrumed between its ends on a pin 227, which is mounted in the frame 54, see Fig. 9, and at its lower end said lever 226 carries a roller 228, shown by dotted lines in Figs. 9 and 11, which projects into a cam groove 230 for the cam disk 231. This cam disk is secured on shaft 75, as appears in Fig. 8. This construction is duplicated at each end of the machine. The cam groove 230 has a portion thereof which is concentric substantially with said disk 231, and therefore, while the roller 228 is in that part of the groove, the frame 220 is held stationary, and this occurs while the upper twisters are operating. Afterward the cam disks pull the frames 220 rearwardly out of the way to remove the upper twisters from the strand wires, and they are held in that position while the roller 228 is passing through the slightly curved inner portion of the cam groove, as shown in Fig. 12.

Referring to Figs. 6, 29 and 30, it is observed that the frame 220 is a skeleton frame with two side bars, one front and one rear, which have in them vertical slots 235 and 236 for the vertical mounting of the horizontal plate 237. Bolts 238 extend through said plate and said slots, whereby said plate may be vertically adjusted and fixed in connection with said frame. The construction is the same on the frames 220 on both ends of the machine. The two plates 237, one at each end of the machine, carry the T-bar 240 that extends entirely crosswise through the machine and is fixed in position. It carries a plate 241 slidable longitudinally of said T-bar, and said plate 241 carries all of the upper twisters, that is, it carries a bracket 242 for each twister mechanism, and all of said brackets, see Fig. 7, carry a shaft 244 on which gears 245 are secured, which mesh with the twisters 246. These twisters have three portions or parts all integral or secured together. The main portion, which is marked 246, is like a spur gear excepting it has a V-shaped radial slot 247 in it running a little beyond the center. To the left-hand side of said part 246, viewed as shown in Figs. 31 and 36, there is a laterally extending reduced portion 249, in the nature of an arbor, which projects through a corresponding opening or bearing in the bracket 242, so that the twister 246 will be rotatably mounted, and at the left-hand side of the bracket 242 a disk plate 247' is secured by the screws 248 to the reduced lateral portion 249 of the twister 246 to hold it in place in its bearing. On the other side of the portion 246 of the twister there are secured a pair of projections 250, one on each side of the slot 247, as shown in Fig. 33.

The upper twisters are driven through the shaft 244 and gear 245 by a large gear 251, which is loosely mounted on a spindle 252 having bearings in the plate 237. The gear 251 is driven by the means shown in Figs. 9 to 11. On the side of the gear 237 there is a three-toothed ratchet wheel or disk 253 mounted loosely on the spindle 252. The ratchet wheel 253 is integral with the gear 251 and is driven by a pawl 254 that is mounted on the crank 255, which is secured on the spindle 252. The crank is revolved by a connecting bar 256, which is pivoted to the outer end of the crank and extends downwardly and on its lower end has a roller 257 that rides on a cam 258', which is secured to the shaft 75. The lower end of the connecting bar 256 is held in place by a cross lever 258 which is pivoted at one end to the lower part of said connecting bar and at the other end is pivoted to the rear part of the frame of the machine, as shown in Figs. 1 and 8. The construction on each end of the machine is the same. The upper twisting mechanism is vertically adjusted into proper place by the set screw 260, see Figs. 9 to 11, which extends through the top of the frame 220 and screws into the plate 237. There is a small hand-lever 261 secured to the upper end of the screw and a head 262 on the underside of the frame bar, which prevents the vertical movement of the screw bolt.

As shown in Figs. 31 and 32, there is a rigid arm 265 which is secured to the edge of the T-bar 240, and at its upper end has a pair of forwardly projecting jaws 266 adapted to engage the cross wires. When the twister is moved into twisting position, as shown in Fig. 31, the strand wire 40 will lie between said arm 265 and the twister, and at that time the V-shaped slot 247 in the twister will register with the space between the jaws 266. When the twister is moved into the twisting position shown in Figs. 30 and 31, the extension 41$^{B'}$ will lie against one of the edge spaces of the projections 250, so that when they are revolved they will engage said extension 41$^{B'}$ and coil it about the main portion of the wire 41$^B$, as shown in Fig. 4.

After the twister has been moved up to the cross wires, as shown in Figs. 30 and 31, the twister is gradually forced to the right, viewed as in Fig. 21, toward the fixed arm 265 by means shown in Figs. 6, 7, 8 and 29. The sliding bar 241, seen in Fig. 29, is held slidably on the T-bar 240 by the arms 265 on one side and the flange 268 on the other side. This bar 241 is moved by connecting bars 270 that are pivoted at one end to the bar 241 and at the other end to a sliding bar 271, which is slidably mounted in the arms 272, which is secured to the frames 54. As seen in Fig. 7, the bar 271 is moved laterally by the lever 273, which is pivoted at one end of the bar 271 and is centrally fulcrumed at 274 to the table 102, and its lower end carries a roller 275, see Fig. 8, which projects in the groove 276 in the periphery of the cam wheel 277, which is secured on the shaft 75. The cam disk 277, groove 276 and the mounting of the lever 273 in connection therewith correspond to the cam disk 165, groove 164' and lever 162, so that both operate similarly and simultaneously. It is obvious, therefore, that when the bar 271 is moved to the left, say, in Fig. 7, the connecting bars 270 will cause a left-wise movement of the bar 241 in which the twisters are mounted and will crowd them all toward the fixed arm 265, see Fig. 31. This tends to force the coil of the extension 41^B' of the cross wire as close to the strand wire 40 as possible and make a tight knot or joint, as shown in Figs. 2 and 4. The stationary rod 280, seen in Fig. 30, is mounted rigidly in the end frames 54 and extends crosswise of the machine immediately in front of the strand wires 40 and holds them in place against the action of the twisters when they are moved up to the fabric, as shown in Fig. 30.

Means are herein shown for holding the cross wires down in place in the lower twisters while the twists are being formed. This mechanism is old but is shown herein to make the device complete. At each end of the machine there is a lever 290, see Fig. 6, fulcrumed at 292 in the stand 291 from the table 102. The construction is the same at both ends of the machine and the inner ends of said levers carry cross bars 293, see Fig. 7. Each bar 293 has a series of holders 294 extending downwardly therefrom, one for each strand wire and partially surrounds the strand wire and is concentric of the twister 103. The bar 293 is laterally slidable on the end of the levers 290, see Fig. 6. The bar 293 projects through parts of said frame so that said frame 220 moves said bar 293 and the holders 294 into and out of place over the twisters. The lever 290 is actuated by a connecting rod 295, which at its lower end has a roller 296 that rides on a cam 297 on the shaft 78, and a connecting bar 299 extends from the lower end of the bar 295 to the bracket 300, see Fig. 8. The bar 299 is held down by springs 130 similar to the springs 130 for the bar 128.

One feature of this invention consists of the means for satisfactorily timing the operation of all the parts. Thus by referring to Fig. 8, it is observed that the shaft 78 times all the parts relating to the operation of the lower twisters, and the shaft 75 times all the parts relating to the upper twisters, and both of said shafts have similar-sized gears thereon meshing with the pinion 73 on the driving shaft 70, so that they will be similarly operated at the same speed. Thus the shaft 78 times the means for feeding in the cross wires, the means for holding and guiding the sections of the wire after they are cut and for uncovering them after the twist has been made. Furthermore, the shaft 75 regulates the operation of the means for moving the sections, after they are cut, over and into place in connection with the lower twisters, and also for regulating the upper twister mechanisms, as shown in Fig. 7. The shaft 75 also controls the means for feeding the wire on the reel and moving the fabric step by step after the cross wires are secured in place, and for moving the same from the lower twisters to the upper twisters.

What I claim as my invention and desire to secure by Letters Patent is:

1. A machine for forming a wire fabric of strand and cross wires, including an intermittently operating means for feeding the strand wires through the machine, means for feeding cross wires into position to be twisted with the strand wires, twisters for twisting the cross wires about the strand wires, and second twisting means to which said cross wires are moved after the first twist has been formed for twisting said cross wires together near the strand wires.

2. A machine for forming a wire fabric of strand and cross wires, including means for conveying and guiding to the strand wires a cross wire for joining each pair of strand wires so that one end of each cross-wire section will project appreciably beyond one of said strand wires, twisters for twisting each cross-wire section around its corresponding pair of strand wires so as to leave one end of the cross wire projecting, and means for subsequently twisting said projecting end around the main portion of the cross wire adjacent the strand wire.

3. A machine for forming a wire fabric of strand and cross wires, including means for conveying and guiding to the strand wires a cross wire for joining each pair of strand wires so that one end of each cross-wire section will project appreciably beyond one of said strand wires and overlap the end of the adjacent cross-wire section, means for twisting the adjacent ends of the two cross-wire sections about the strand wire so as to leave one end of one cross-wire section projecting, and means for subsequently twisting said projecting end around the main portion of the cross wire adjacent the strand wire.

4. A machine for forming a wire fabric of strand and cross wires, including means for conveying and guiding to the strand wires a cross wire for joining each pair of strand wires so that one end of each cross-wire section will project appreciably beyond one of said strand wires and overlap the end of the adjacent cross-wire section and so that the adjacent ends of the cross-wire sections will lie on opposite sides of each strand wire, a twister for simultaneously twisting the short and long ends of said adjacent cross-wire sections, whereby the cross wire with the long end will be coiled around the coil formed by the cross wire with the short end and leave an end projecting, and means for subsequently twisting said projecting end around the main portion of the cross wire adjacent the strand wire.

5. A machine for forming a wire fabric of strand and cross wires, including rotary twisters through which the strand wires pass, means for conveying and guiding to said twisters a cross wire for joining each pair of strand wires that extends across a pair of twisters and one end extends beyond the twisters and overlaps the end of the adjacent cross wire section and so that the adjacent end of the cross wire sections will lie on opposite sides of each strand wire, means for operating said twisters to twist said cross wire sections around the strand wires and leave an end projecting from one of said cross wires near each strand wire, and means for subsequently twisting said projecting end around a cross wire adjacent the strand wires.

6. A machine for forming a wire fabric of strand and cross wires, including rotary twisters through which the strand wires pass and which have a diametric groove in the head thereof, means for conveying and guiding to said twisters a cross wire for joining each pair of strand wires that extends across a pair of twisters and one end extends beyond the twisters and overlaps the end of the adjacent cross-wire section and so that the adjacent ends of the cross-wire sections will lie on opposite sides of each strand wire and when the twister is started will enter the groove therein, means for operating said twisters to twist said cross-wire sections around the strand wires and leave an end projecting from one of said cross wires near each strand wire, and means for subsequently twisting said projecting end around a cross wire adjacent the strand wires.

7. A machine for forming a wire fabric of strand and cross wires, including rotary twisters through which the strand wires pass, a horizontal plate extending transversely of the machine in connection with which said twisters are mounted in a row, means for feeding and guiding a cross wire for each pair of strand wires along on said plate so that the advancing end of each cross wire will extend across its appropriate twister, means on said plate for severing said wires after they have reached the twisters and so that the sections severed will extend from one twister to the next twister adjacent thereto and overlap the adjacent end of the next cross-wire section in the series, means for operating said twisters to twist said cross-wire sections around the strand wires and leave an end projecting from one of said cross wires near each strand wire, and means for subsequently twisting said projecting end around a cross wire adjacent the strand wires.

8. A machine for forming a wire fabric of strand and cross wires, including rotary twisters through which the strand wires pass, a horizontal plate extending transversely of the machine in connection with which said twisters are mounted in a row, means for feeding and guiding a cross wire for each pair of strand wires along on said plate so that the advancing end of each cross wire will extend across its appropriate twister, means on said plate for severing said wires after they have reached the twisters and so that the sections severed will extend from one twister to the next twister adjacent thereto and overlap the adjacent end of the next cross-wire section in the series, and means for holding the ends of all the cross wires in place while being severed, means for operating said twisters to twist said cross-wire sections around the strand wires and leave an end projecting from one of said cross wires near each strand wire, and means for subsequently twisting said projecting end around a cross wire adjacent the strand wires.

9. A machine for forming a wire fabric of strand and cross wires, including rotary twisters through which the strand wires pass, a horizontal plate extending transversely of the machine in connection with which said twisters are mounted in a row, means for feeding and guiding a cross wire for each pair of strand wires along on said plate so that the advancing end of each cross wire will extend across its appropriate twister, means on said plate for severing said wires after they have reached the twisters and so that the sections severed will extend from one twister to the next twister adjacent thereto and overlap the adjacent end of the next cross-wire section in the series, means for holding the ends of all the cross wires in place while being severed, said holding means being mounted on said plate and adapted to hold the cross wire down in place, means for operating said twisters to twist said cross-wire sections around the strand wires and leave an end projecting from one of said cross wires near each strand wire, and means for subsequently twisting said projecting end around a cross wire adjacent the strand wires.

10. A machine for forming a wire fabric of strand and cross wires, including rotary twisters through which the strand wires pass, a horizontal plate extending transversely of the machine in connection with which said twisters are mounted in a row, an oscillatory arm angular in cross section and lying on said plate between each pair of twisters and fulcrumed concentrically at one end with one twister, means for feeding and guiding a cross wire for each pair of strand wires along on said plate and with the end resting upon said arm longitudinally thereof and so that the advancing end will extend across its appropriate twister, means on said plate for severing said wires after they have reached the twister and so that the sections severed will extend from one twister to the next twister adjacent thereto and overlap the adjacent end of the next cross-wire section in the series and extend beyond the free end of said arm, means for actuating said arms so as to move the cut ends of the sections of cross wires in position over the adjacent twisters and the strand wires passing therethrough, means for operating said twisters to twist said cross-wire sections around the strand wires and leave an end projecting from one of said cross wires near each strand wire, and means for subsequently twisting said projecting end around a cross wire adjacent the strand wires.

11. A machine for forming a wire fabric of strand and cross wires, including rotary twisters through which the strand wires pass, a horizontal plate extending transversely of the machine in connection with which said twisters are mounted in a row, an oscillatory arm angular in cross section and lying on said plate between each pair of twisters and fulcrumed concentrically at one end with one twister, means for feeding and guiding a cross wire for each pair of strand wires along on said plate and with the end resting upon said arm longitudinally thereof and so that the advancing end will extend across its appropriate twister, means on said plate for severing said wires after they have reached the twister and so that the sections severed will extend from one twister to the next twister adjacent thereto and overlap the adjacent end of the next cross-wire section in the series and extend beyond the free end of said arm, means for actuating all of said arms simultaneously so as to move the cut ends of the sections of cross wires in position over the adjacent twisters and the strand wires passing therethrough, means for operating said twisters to twist said cross-wire sections around the strand wires and leave an end projecting from one of said cross wires near each strand wire, and means for subsequently twisting said projecting end around a cross wire adjacent the strand wires.

12. A machine for forming a wire fabric of strand and cross wires, including rotary twisters through which the strand wires pass, a horizontal plate extending transversely of the machine in connection with which said twisters are mounted in a row, an oscillatory arm angular in cross section and lying on said plate between each pair of twisters and fulcrumed concentrically at one end with one twister, means for feeding and guiding a cross wire for each pair of strand wires along on said plate and with the end resting upon said arm longitudinally thereof and so that the advancing end will extend across its appropriate twister, means on said plate for severing said wires after they have reached the twister and so that the sections severed will extend from one twister to the next twister adjacent thereto and overlap the adjacent end of the next cross-wire section in the series and extend beyond the free end of said arm, means for actuating said arms so as to move the cut ends of the sections of cross wires in position over the adjacent twisters and the strand wires passing therethrough, a wire holding plate mounted in connection with said horizontal plate and resting upon said arm over the cross wires therein for holding the wire in place, and means for operating said twisters to twist said cross-wire sections around the strand wires and leave an end projecting from one of said cross wires near each strand wire, and means for subsequently twisting said projecting end around a cross wire adjacent the strand wires.

13. A machine for forming a wire fabric of strand and cross wires, including means for feeding the strand wires through the machine, means for feeding cross wires into position to be twisted with the strand wires, twisters for twisting the cross wires about the strand wires, a second set of twisters beyond said first-mentioned twisters for twisting the cross wires together, means for moving said second set of twisters toward and away from the strand wires so as to engage the cross wires, and means for operating the second series of twisters after the same has been moved in said position.

In witness whereof, I have hereunto affixed my signature in the presence of the witnesses herein named.

THEODORE M. CONNER.

Witnesses:
R. B. RANDALL,
M. K. CUMMINS.

Copies of this patent may be obtained for five cents each, by addressing the "Commissioner of Patents, Washington, D. C."